(12) United States Patent
Hesslewood et al.

(10) Patent No.: US 11,130,317 B2
(45) Date of Patent: Sep. 28, 2021

(54) HYBRID UNDERLAYMENT FOR NON TEXTILE FLOOR COVERING

(71) Applicant: The Boeing Company, Chicago, IL (US)

(72) Inventors: Sean Richard Hesslewood, Everett, WA (US); Hongming Dong, Lake Forest Park, WA (US); David Eugene Sterling, Edmonds, WA (US); Rick E. Shepherd, Arlington, WA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 16/653,058

(22) Filed: Oct. 15, 2019

(65) Prior Publication Data

US 2021/0107259 A1    Apr. 15, 2021

(51) Int. Cl.
| | |
|---|---|
| *B32B 27/06* | (2006.01) |
| *B32B 5/18* | (2006.01) |
| *B32B 7/14* | (2006.01) |
| *B64C 1/18* | (2006.01) |

(Continued)

(52) U.S. Cl.
CPC .............. *B32B 27/065* (2013.01); *B32B 5/18* (2013.01); *B32B 7/08* (2013.01); *B32B 7/14* (2013.01); *B32B 27/304* (2013.01); *B32B 2255/10* (2013.01); *B32B 2266/0214* (2013.01); *B32B 2266/06* (2013.01); *B32B 2266/08* (2013.01); *B32B 2307/546* (2013.01); *B32B 2307/554* (2013.01); *B32B 2307/72* (2013.01); *B32B 2605/003* (2013.01); *B32B 2605/18* (2013.01); *B64C 1/18* (2013.01)

(58) Field of Classification Search
CPC ........... B32B 27/065; B32B 5/18; B32B 7/08; B32B 7/14; B32B 27/304; B32B 2255/10; B32B 2266/0214; B32B 2266/06; B32B 2266/08; B32B 2307/546; B32B 2307/554; B32B 2307/72; B32B 2605/003; B64C 1/18; E04F 15/02
See application file for complete search history.

(56) References Cited

U.S. PATENT DOCUMENTS 5,624,622 A * 4/1997 Boyce .................. B29C 44/569
264/258
6,824,851 B1 * 11/2004 Locher .................. B29C 69/001
428/76

OTHER PUBLICATIONS

3M, Scotch® Fire-Retardant Electric Arc Proofing Tape 77 Series, 78-8124-5426-8 Rev F, May 2013.

(Continued)

*Primary Examiner* — Catherine A. Simone
(74) *Attorney, Agent, or Firm* — Vivacqua Crane (57) ABSTRACT

A hybrid underlayment including a compliant material layer and a rigid material layer affixed to the compliant material layer. The compliant material layer exhibits a compression deflection as measured according to ASTM standard D-1056-14 in the range of from about 0.14 kilogram force per square centimeter to about 1.76 kilogram force per square centimeter, and a thickness of at least about 2 millimeters. The rigid material layer exhibits a thickness of at least about 0.5 millimeters and a flexural modulus of at least about 600 MPa and flexural strength of at least about 35 MPa in both the length and width directions, both flexural modulus and flexural strength as measured according to ASTM D790-17.

20 Claims, 5 Drawing Sheets

(51) Int. Cl.
B32B 7/08 (2019.01)
B32B 27/30 (2006.01)

(56) References Cited

OTHER PUBLICATIONS

AeroWindTech, BMS1-68 Grade A Form II/III Silicone Foam Tapes, Rogers Corporation, <http://aerowindtech.com/assets/bms1-68-02082015.pdf>, accessed Sep. 6, 2019.
Berry Gobal, Polyken® 1111 FR Lightweight Double-Sided Carpet Tape, May 29, 2018.
Cooper Standard, DUROFLOOR®, <https://www.cooperstandard.com/sites/default/files/Aviation%20Flooring/durofloor_RZ.pdf>, accessed Sep. 6, 2019.
Cooper Standard, Aviation Flooring Products, <https://www.cooperstandard.com/aviation-flooring-products>, accessed Jan. 2, 2019.
Declaration of Sean Richard Hesslewood, executed Dec. 20, 2019.
FindTape.com, Polyken 108FR Flame Retardant Double Coated Cloth Carpet Tape, <https://www.findtape.com/Polyken-108-Flame-Retardant-Double-Coated-Cloth-Tape/p145/>, accessed Sep. 6, 2019.
Gillfab 1367A Laminate, Product Data Sheet, Aug. 2004.
Marsh Bellofram, Bellofram Closed Cell Silicone Sponge Molded Elastomer Products, <https://www.marshbellofram.com/bellofram-silicones/products/bellofram-closed-cell-silicone-sponge-molded-products/>, accessed Sep. 9, 2019.
Marsh Bellofram, BMS 1-60 Grade C Extruded Silicone Sponge Products, 2016.
Schneller, AerFusion eco®,<www.schneller.com/Product?id=41> accessed Dec. 20, 2019.
Schneller, AerFusion® fit,<www.schneller.com/aircraft-interior-non-texilte-flooring/aerfusion-eco> accessed Dec. 20, 2019.
Zotefoams, Zotek High Performance Foams, Dec. 2010.

* cited by examiner

HYBRID UNDERLAYMENT FOR NON TEXTILE FLOOR COVERING

FIELD

The present disclosure is directed to a hybrid underlayment for a floor covering. More particularly, the present disclosure is directed to a hybrid underlayment for a non-textile floor covering.

BACKGROUND

Transportation vehicles, including aircraft, trains, busses, emergency vehicles, cruise ships, and like transportation vehicles often include floor covering that is intended to create an aesthetically pleasing appearance. Movement of passengers, luggage, and equipment over the floor covering exposes the floor covering to relatively high wear. Floor covering in transportation vehicles may also be affected by environmental factors such as, for example, temperature changes and changes in relative humidity. Furthermore, floors covering may be exposed to dirt, liquids, and light in the ultraviolet, visible and infrared spectrums. These factors, combined with utilization of floor covering on uneven or movable surfaces, such as those commonly found in transportation vehicles, may lead to excess wear and buckling, where the floor pulls up or lifts off of the sub-floor. These factors may also lead to telegraphing, which refers to visible patterns or marks that appear on the surface of a floor covering due to the unevenness of a substrate to which floor covering is affixed. Telegraphing may also be caused by, for example, discontinuities or gaps present in the sub-floor, or by mechanical fasteners placed in the sub-floor.

SUMMARY

According to several embodiments or examples of the present disclosure, a hybrid underlayment is provided. The hybrid underlayment includes a compliant material layer. The compliant material layer exhibits a compression deflection as measured according to ASTM standard D-1056-14 in the range of from about 0.14 kilogram force per square centimeter to about 1.76 kilogram force per square centimeter, and a thickness of at least about 2 millimeters. The hybrid underlayment further includes a rigid material layer affixed to the compliant material layer. The rigid material layer exhibits a thickness of at least about 0.5 millimeters and a flexural modulus of at least about 600 MPa and flexural strength of at least about 35 MPa, both flexural modulus and flexural strength as measured according to ASTM D790-17.

According to additional embodiments, the rigid material layer comprises a fiberglass reinforced phenolic laminate.

According to additional embodiments, the rigid material layer is affixed to the compliant material layer by a double sided adhesive tape.

According to additional embodiments, the compliant material layer exhibits a density in the range of from about 160 kg/m$^3$ (kilograms per cubic meter) to about 480 kg/m$^3$.

According to additional embodiments, compliant material layer includes at least one of an open cell foam and a closed cell foam. The compliant material layer further comprises at least one polymer material selected from the group consisting of silicone, polyvinylidene, thermoset polyurethane, thermoplastic polyurethane, poly(vinyl chloride), ethylene propylene diene terepolymer, polyolefin, melamine, epichlorohydrin, styrene butadiene rubber, and polyamide.

According to additional embodiments, the compliant material layer exhibits a Shore OO durometer in the range of from about 10 Shore OO to about 90 Shore OO.

According to further embodiments of the above, a wear layer is affixed to the rigid material layer to form a floor covering. The wear layer exhibits a Taber wear resistance of less than about 0.3 grams of weight loss as measured according to ISO 9352 with a 1 kg weight over 1,000 cycles using a H18 calibrade wheel. Further, in such as embodiments, the floor covering exhibits an areal density in the range of from about 2.4 kg per square meter to about 8.5 kilograms per square meter and an overall thickness in the range of from about 3 millimeters to about 15 millimeters.

According to additional embodiments, the wear layer exhibits a thickness in the range of from about 0.25 millimeters to about 3.0 millimeters.

According to additional embodiments, the wear layer comprises polyvinyl chloride.

According to additional embodiments, the rigid material layer is affixed to the wear layer by a double sided adhesive tape.

According to additional embodiments, the wear layer comprises a decorative layer and a sealant coating disposed on the decorative layer.

According to several embodiments of the present disclosure, a transportation vehicle is provided. The transportation vehicle includes a substrate and a floor covering disposed over the substrate. The floor covering includes a plurality of floor panels. The floor panels each include a compliant material layer affixed to the substrate. The compliant material layer exhibits a compression deflection as measured according to ASTM standard D-1056-14 in the range of from about 0.14 kilogram force per square centimeter to about 1.76 kilogram force per square centimeter, and a thickness of at least about 2 millimeters. The floor panels each further include a rigid material layer affixed to the compliant material layer. The rigid material layer exhibits a thickness of at least about 0.5 millimeters and a flexural modulus of at least about 600 MPa and flexural strength of at least about 35 MPa, both flexural modulus and flexural strength as measured according to ASTM D790-17. The floor panels each yet further include a wear layer affixed to the rigid material layer. The wear layer exhibits a Taber wear resistance of less than about 0.3 grams of weight loss as measured according to ISO 9352 with a 1 kg weight over 1,000 cycles using a H18 calibrade wheel. The floor covering exhibits an areal density in the range of from about 2.4 kilograms per square meter to about 8.5 kilograms per square meter and an overall thickness in the range of from about 3.0 millimeters to about 15 millimeters.

According to additional embodiments, the floor covering exhibits no buckling across the surface area of the floor covering as measured by test method BMS8-434, section 8.13 with a substrate gap closure of 2.54 millimeters.

According to additional embodiments, the floor panels are affixed to the substrate with a double sided adhesive tape.

According to additional embodiments, the floor panels are affixed to the substrate using a hook fastener and a loop fastener. Either the hook fastener or the loop fastener is adhered to the compliant material layer and the other of the hook fastener and the loop fastener is adhered to the substrate.

According to additional embodiments, at least one floor panel comprises a first locking feature that is configured to mate with a second locking feature on an adjacent floor panel.

According to further embodiments, the first locking feature and the second locking feature comprises at least one of the following: tongue and groove, a lap joint, a biscuit joint, and a button and strap.

According to additional embodiments, the thickness of at least one of the compliant material layer and the rigid material layer vary across a total surface area of the floor covering.

According to additional embodiments, the transportation vehicle comprises an aircraft.

According to several embodiments of the present disclosure, a method of reducing buckling in a transportation vehicle is provided. The method includes layering a floor covering onto a substrate securing the floor covering to the substrate. The floor covering includes a compliant material layer. The compliant material layer exhibits a compression deflection as measured according to ASTM standard D-1056-14 in the range of from about 0.14 kilograms force per square centimeter to about 1.76 kilograms force per square centimeter, and a thickness of at least about 2 millimeters. The floor covering further includes a rigid material layer affixed to the compliant material layer. The rigid material layer exhibits a thickness of at least about 0.5 millimeters and a flexural modulus of at least about 600 MPa and flexural strength of at about least 35 MPa, both flexural modulus and flexural strength as measured according to ASTM D790-17. The floor covering yet further includes a wear layer affixed to the rigid material layer. The wear layer exhibits a Taber wear resistance of less than about 0.3 grams of weight loss as measured according to ISO 9353 with a 1 kilogram (kg) weight over 1,000 cycles using a H18 calibrade wheel. The floor covering exhibits an areal density in the range of from about 2.4 kilograms per square meter to about 8.5 kilograms per square meter and an overall thickness in the range of from about 3.0 millimeters to about 15 millimeters. The floor covering exhibits no buckling across the surface area of the floor covering as measured by test method BMS8-434, section 8.13 with a substrate gap closure of 2.54 millimeters.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed to a hybrid underlayment for a floor covering. The hybrid underlayment includes a rigid material layer and a compliant material layer. In particular, the present disclosure is directed to hybrid underlayment for a non-textile floor covering. Non-textile floor coverings may be understood as floor coverings that include a durable, impermeable wear surface. In embodiments, the hybrid underlayment is used in transportation vehicles and is applied over a substrate, such as a sub-floor. The visible wear layer is applied over the hybrid underlayment to provide a wear resistant surface. Use of both a rigid material layer and a compliant material layer under the wear layer, in embodiments, mitigates both buckling and telescoping of the floor covering.

Rigid Material Layer

Figure 1:
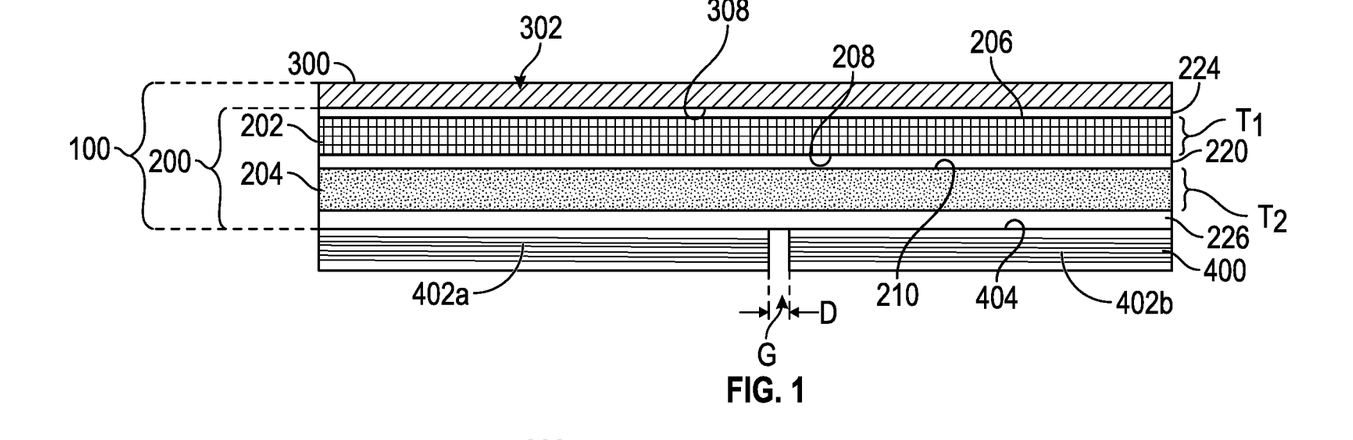
FIG. 1 is a schematic representative of an exemplary embodiment of a floor covering including a hybrid underlayment of the present disclosure.

FIG. 1 illustrates a first exemplary embodiment of a hybrid underlayment 200 for a floor covering 100. As noted above, the hybrid underlayment 200 includes a rigid material layer 202 and a compliant material layer 204. The rigid material layer 202 is relatively less flexible when compared to the compliant material layer 204. The rigid material layer 202 exhibits a flexural modulus of at least 600 mega pascals (MPa), including all values and ranges from 600 MPa to 10 GPa, such as in the range of 600 MPa to 2 GPa, etc., and a flexural strength of at least 35 MPa, including all values and ranges from 35 MPa to 200 MPa, such as in the range of 35 MPa to 75 MPa, etc., in either the length and width directions, both flexural modulus and flexural strength as measured according to ASTM D790-17. It is noted that where the rigid material layer 202 includes fabric, the flexural modulus is measured in both warp and fill directions. In addition, the rigid material layer 202 exhibits a thickness $T_1$ of at least about 0.50 millimeters, including all values and ranges from about 0.5 millimeters to about 3.0 millimeters, such as in the range of 0.50 millimeters to 1.27 millimeters. If multiple layers of a rigid material are provided to form the rigid material layer 202, each layer is greater than about 0.25 millimeters in thickness and at least a sufficient number of layers are included to provide the rigid material layer 202 of at least about 0.50 millimeters in thickness.

In embodiments, the rigid material layer 202 comprises a thermoplastic composite or a thermoset composite. Composites include but are not limited to one or more layers of woven or non-woven fabric of fiberglass, ultrahigh molecular weight polyethylene, poly-paraphenylene terephthalamide, carbon fiber, or combinations thereof impregnated with at least one of phenolic, epoxy, polyimide resins or mixtures or combinations thereof. In further embodiments, composites may also include, but are not limited to, carbon, graphite fiber, metal fiber reinforced polymers including at least one of a phenolic, epoxy and polyimide resins. In particular embodiments, the rigid material layer 202 includes a fiberglass reinforced phenolic laminate. In non-limiting exemplary embodiments, the rigid material layer 202 includes a material that meets one or more of the following specifications: BMS 8-43 Type 20, BMS 8-2 Type 35, BMS 8-223 Type 30 and BMS-233 Type 40 laminate material, such as GILFAB 1367, 1367A Laminate available from M.C. Gill Corporation.

Compliant Material Layer

The compliant material layer 204 is relatively more flexible when compared to the rigid material layer 202. The compliant material layer 204 exhibits a compression deflection at 25%, as measured according to ASTM standard D-1056-14, in the range of from about 0.14 kilograms force per cubic centimeter ($kg_f/cm^2$) to about 1.76 $kg_f/cm^2$, including all values and ranges therein. In additional embodiments, the compliant material layer 204 exhibits a density in the range of from about 160 $kg/m^2$ (kilograms per cubic meter) to about 480 $kg/m^2$, including all values and ranges therein, such as 160 $kg/m^2$ to 240 $kg/m^2$, 250 $kg/m^2$ to 400 $kg/m^2$, etc. The compliant material layer 204 further exhibits a thickness $T_2$ of at least about 2 millimeters, such as in the range of 2 millimeters to 8 millimeters, including all values and ranges therein. It is noted the thickness of the compliant material layer 204 may be adjusted across the total surface area (see 604 in FIG. 6) to accommodate changes in the relative height of the substrate 400.

The compliant material layer 204 may be, in embodiments, thermoplastic foam or thermoset foam, including a crosslinked or un-crosslinked, open cell foam or closed cell foam. In embodiments, the foam includes at least one of the following: silicone, polyvinylidene, thermoset polyurethane, thermoplastic polyurethane, poly(vinyl chloride), ethylene propylene diene terepolymer, polyolefin such as polyethylene or polypropylene, melamine, epichlorohydrin, styrene butadiene rubber, and/or polyamide. In particular embodiments, the foam includes silicone foam or another foam that meets FAR 25.853 and 25.855 Appendix F, Part I and III standards. In non-limiting exemplary embodiments, the compliant material layer 204 includes a material that meets one or more of the following specifications: BMS 1-60 TIGAF2, GMS 8-409 TIC1GA, BMS 8-371 TIC1G2, BMS 8-51 TI G8-5, GMS 8-51 TIG10-15 and BMS 1-68, such as Bellofram BMS 1-60 Grade C available from Bellofram Silicones.

Figure 2:
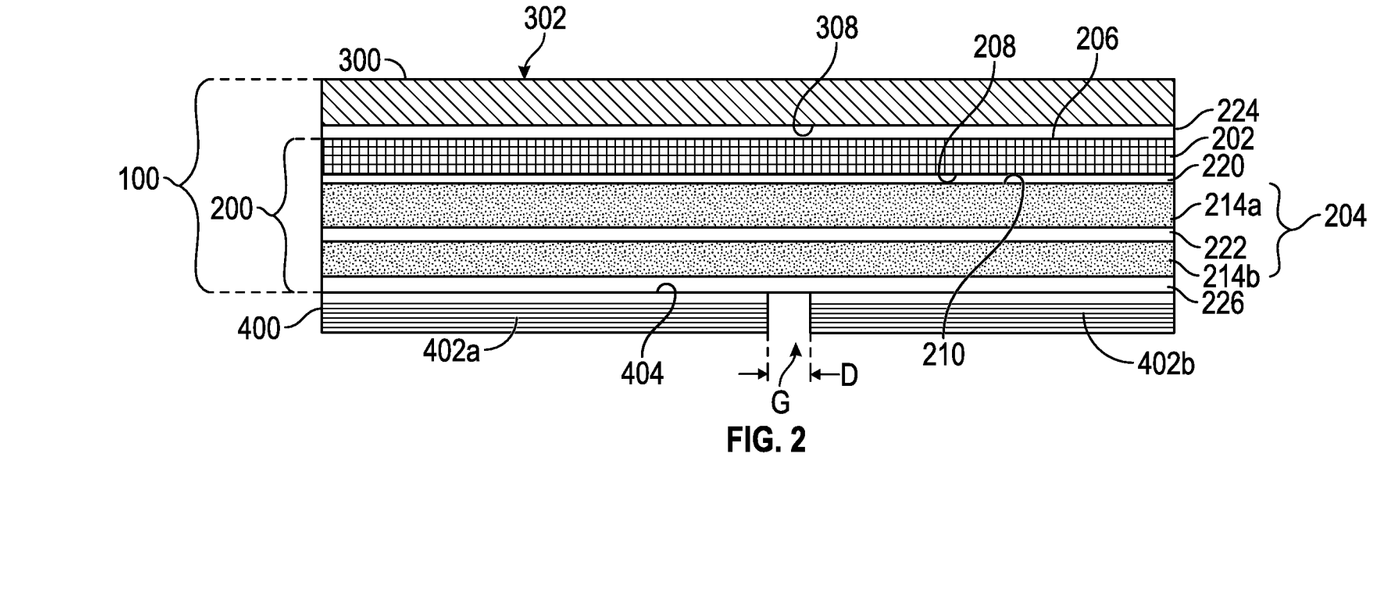
FIG. 2 is schematic representative representation of an exemplary embodiment of floor covering including a hybrid underlayment of the present disclosure.

In further embodiments, as illustrated in FIG. 2, the compliant material layer 204 includes more than one layer, such as two compliant material layers 214a, 214b or more. If more than one compliant material layer 214a, 214b is present, each compliant material layer 214a, 214b exhibits a compression deflection at 25%, as measured according to ASTM standard D-1056-14, in the range of from about 0.14 kilograms force per square centimeter ($kg_f/cm^2$) to about 1.76 $kg_f/cm^2$, including all values and ranges therein. In additional embodiments, the compliant materials layer 214a, 214b each exhibit a density in the range of from about 160 $kg/m^3$ (kilograms per cubic meter) to about 480 $kg/m^3$, including all values and ranges therein, such as 160 $kg/m^3$ to 240 $kg/m^3$, 250 $kg/m^3$ to 450 $kg/m^3$, etc. Further, each compliant material layer 214a, 214b exhibits a thickness of at least about 2 millimeters, such as in the range of 2 millimeters and 8 millimeters, or 2 to about 6 millimeters, including all values and ranges therein. Each compliant material layer 214a, 214b is also selected from the materials enumerated above with respect to the compliant material layer 204. Accordingly, the compliant material layers 214a, 214b may be the same material or different materials Adhesive Layer The rigid material layer 202 and the compliant material layer 204 are adhered together with adhesive layer 220. The adhesive layer 220 is in the range of about 0.1 millimeters to 1.0 millimeters thick including all values and ranges therein, such as 0.1 millimeters to 1.0 millimeters, 0.1 millimeters to 0.3 millimeters, 0.5 millimeter to 1.0 millimeters, etc. In embodiments, the adhesive layer 220 is at least one of a pressure sensitive adhesive, hot melt adhesive, or thermosetting adhesive. Pressure sensitive adhesives are generally understood as adhesives that flow into or wet the surfaces that they contact and include, for example, natural rubber, synthetic rubber, acrylic or silicone based polymers. Hot melt adhesives are generally understood as adhesives which are heated at a temperature sufficient to allow the adhesive polymer to flow and wet the surfaces that they contact, and include, for example, ethylene vinyl acetate; ethylene acrylate; polyolefins such as low density polyethylene, high density polyethylene, atactic polypropylene, polybutene-1; amorphous polyolefins such as amorphous (atactic) propylene (APP), amorphous propylene/ethylene (APE), amorphous propylene/butene (APB), amorphous propylene/hexene (APH), amorphous propylene/ethylene/butane; polyamides; polyesters; polyurethane; styrene block co-polymers; and silicone. Thermosetting adhesives are generally understood as one part or two part systems that crosslink and include, for example, silicone adhesive, epoxy resin, phenolic formaldehyde (PF) resins, phenolic neoprene, resorcinol formaldehydes (RF), polyesters, and polyimides. As may be appreciated, some adhesives may fall into more than one of the categories of pressure sensitive, hot melt and thermosetting adhesives.

In embodiments, the adhesive layer 220 is applied across the entire interface between adjacent surfaces 208, 210 of the rigid material layer 202 and the compliant material layer 204. Alternatively, the adhesive layer 220 is applied in discrete regions between the adjacent surfaces 208, 210 of the rigid material layer 202 and the compliant material layer 204, such as in dot, line or other geometric patterns, or in random locations across the adjacent surfaces 208. Further, in embodiments, the adhesive layer 220 is provided as a film, sprayed, roll coated, curtain coated, printed, or otherwise deposited onto either the rigid material layer 202, the compliant material layer 204, or both the rigid material layer 202 and the compliant material layer 204. In further embodiments, the adhesive layer 220 is coated on the compliant material layer 204 and a release film (not illustrated) is placed on the adhesive layer 220 until the compliant material layer 204 and rigid material layer 202 are assembled.

Figure 4:
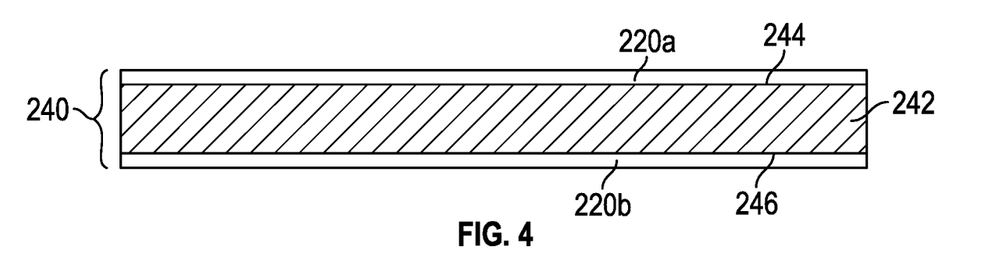
FIG. 4 is a schematic representative representation an exemplary embodiment of a double sided adhesive tape for use as an adhesive.

In alternative embodiments, the adhesive layer 220 is provided by a double sided adhesive tape 240 illustrated in FIG. 4. In this embodiment, an adhesive layer 220a, 220b, is applied to both the first side 244 and the second side 246 of a carrier film 242. The adhesive layer 220a, 220b includes one or more of any of the adhesives noted above and the adhesive is individually selected for each side 244, 246 of the carrier film 242. Stated another way, the adhesive layer 220a affixed to the first side 244 of the carrier film 242 may be the same as, or different from, the adhesive layer 220b affixed to the second side 246 of the carrier film 242. The carrier film 242 includes, e.g., one or more of the following materials: polyester, polyolefins including low density polyethylene, polyimide, poly(vinyl chloride), silicone, acrylic films, fiberglass, polytetrafluoroethylene, polyvinylidene fluoride, polymer filament or fiberglass filament. The carrier film 242 may also be a foam, including a foam formed from one or more of the following: silicone, polyvinylidene, thermoset polyurethane, thermoplastic polyurethane, poly (vinyl chloride), ethylene propylene diene terepolymer, polyolefin such as polyethylene or polypropylene, melamine, epichlorohydrin, styrene butadiene rubber, and polyamide. In non-limiting exemplary embodiments, the double sided adhesive tape 240 includes POLYKEN 108 or POLYKEN 1111 available from Berry Products, or BAC5010 Type 77 available from AeroBase Group.

If multiple compliant material layers 214a, 214b are provided, it is to be appreciated that an additional adhesive layer 222 is provided between the compliant material layers 214a, 214b as shown in FIG. 2. The additional adhesive layer 222, when present, is selected from the adhesives described above with regard to the adhesive layer 220 placed between the rigid material layer 202 and the compliant material layer 204 and the additional adhesive is applied in the manners and methods noted above with respect to the adhesive layer 220 between the compliant material layer 204 and the rigid material layer 202. In addition, the additional adhesive 222 may be carried by one or both of the compliant material layers 214a, 214b prior to joining the compliant material layers 214a, 214b together. In alternative embodiments, the additional adhesive 222 is provided by a double sided adhesive tape 240 as illustrated and described above with reference to FIG. 4.

Wear Layer

Figure 3:
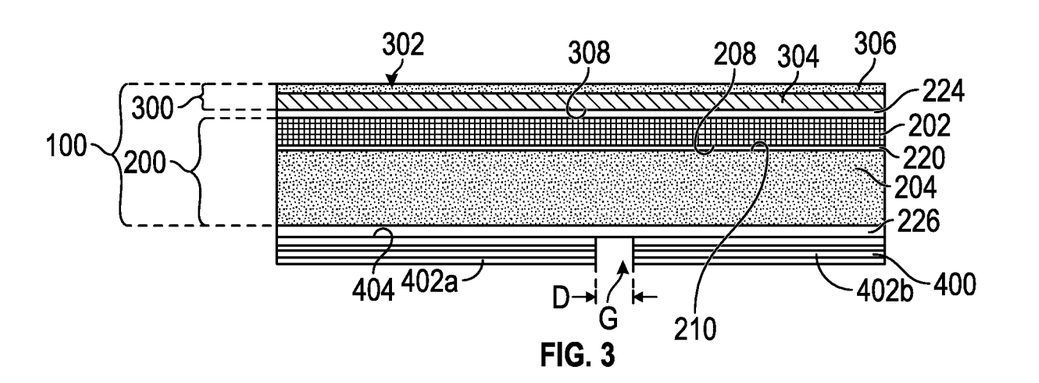
FIG. 3 is schematic representative representation of an exemplary embodiment of floor covering including a hybrid underlayment of the present disclosure.

Referring now to FIGS. 1 through 3, in embodiments, a floor covering 100 is provided herein that includes a wear layer 300 affixed to the hybrid underlayment 200. The wear layer 300 is understood to include an exposed surface 302, i.e., a surface that is not affixed to the underlayment. In embodiments, the exposed surface 302 is visually appealing and may resemble hard wood, carpet, or vinyl flooring with or without various geometric patterns. In an alternative embodiment illustrated in FIG. 3, the wear layer 300 includes a decorative layer 304, which may be understood as a sheet or film that includes markings, patterns or other designs, covered by a sealant coating 306. In such embodiments, the sealant coating 306 provides the exposed surface 302. Further, the sealant coating 306 may be translucent and, in particular embodiments, transparent. In yet further alternative embodiments, the wear layer 300 may also include a foam layer, including one or more compliant materials noted above, a structural layer, including one or more of the rigid material noted above, as well as additional materials; however, it is to be understood that the foam layer and the structural layer are thinner than the compliant material layer 204 and the rigid material layer 202 of the hybrid underlayment 200 noted above.

The wear layer 300, and in particular, the surface of the wear layer 300 exhibits a Taber wear resistance of less than about 0.3 grams (g) of weight loss as measured according to ISO 9352 with a 1 kilogram (kg) weight over 1,000 cycles using a H18 calibrade wheel, including all values and ranges therein, such as 0.0 grams (where no loss is exhibited), 0.1 grams to 0.3 grams, etc. In embodiments, the wear layer 300 exhibits a thickness in the range of at least 0.25 millimeters to 3.0 mm, including all values and ranges therein, such as 0.25 millimeters to 0.50 millimeters, etc. In embodiments, the wear layer 300 includes a single layer of material, such as a polymer material, cork, or wood. Polymer materials include, e.g., poly(vinyl chloride), elastomers, thermoplastic elastomers, natural rubber or synthetic rubber. If a decorative layer 304 is present, the decorative layer 304 includes, e.g., poly(vinyl chloride), polyurethane, or other polymeric materials and the sealant coating 306 includes e.g., poly (vinyl chloride), polyurethane, or other polymeric materials. In non-limiting exemplary embodiments, the wear layer includes BATIFLEX AVM 282G floor mats available from GERFLOR or Durofloor available from CooperStandard, ECO and FIT mats available from Scheneller or NEXFLOR from DURACOTE, LONCOIN FEATHERWEIGHT and LONPETITE FEATHERWEIGHT from Lonseal.

In embodiments, and as shown in at least FIGS. 1 and 2, the wear layer 300 is affixed to rigid material layer 202 by an wear layer adhesive layer 224 applied across the entire interface between adjacent surfaces 206, 308 of the rigid material layer 202 and the wear layer 300. Alternatively, the wear layer adhesive layer 224 is applied in discrete regions between the adjacent surfaces 206, 308 of the rigid material layer 202 and the wear layer 300, such as in dot, line or other geometric patterns, or in random locations across the adjacent surfaces 206, 308. Further, in embodiments, the wear layer adhesive layer 224 is provided as a film, sprayed, roll coated, curtain coated, printed, or otherwise deposited onto either the rigid material layer 202, the wear layer 300, or both the rigid material layer 202 and the wear layer 300. In further embodiments, the wear layer adhesive layer 224 is coated on the rigid material layer 202 or the wear layer 300 and a release film (not illustrated) is placed on the wear layer adhesive layer 224 until the wear layer 300 and rigid material layer 202 are assembled. In alternative embodiments, the wear layer adhesive layer 224 is provided by a double sided adhesive tape 240 described and illustrated with reference FIG. 4.

In embodiments, the floor covering 100 exhibits an areal density in the range of from about 2.4 kilograms per square meter (kg/m$^2$) to 8.5 kg/m$^2$, including all values and ranges therein, such as 2.5 kg/m$^2$ to 8.0 kg/m$^2$. It is to be appreciated that to limit the weight of the floor covering 100, in further embodiments, the floor covering 100 consists of, or is limited to the hybrid underlayment 200, wear layer 300 and adhesive layers 220, 222, 224, 226 described herein. In addition, in embodiments, the floor covering 100 exhibits an overall thickness in the range of from about from 3 millimeters to about 15 millimeters. Further, in embodiments, the floor covering 100 exhibits no buckling as measured by test method BMS 8-434, section 8.13 with a substrate gap closure of 2.54 mm, described further with reference to FIG. 10 herein. As understood herein, no buckling is a situation where buckling is not visibly detectable and the upward deflection of the surface 302 floor covering 100 is below about 0.5 mm or less.

Floor Panels

Figure 6:
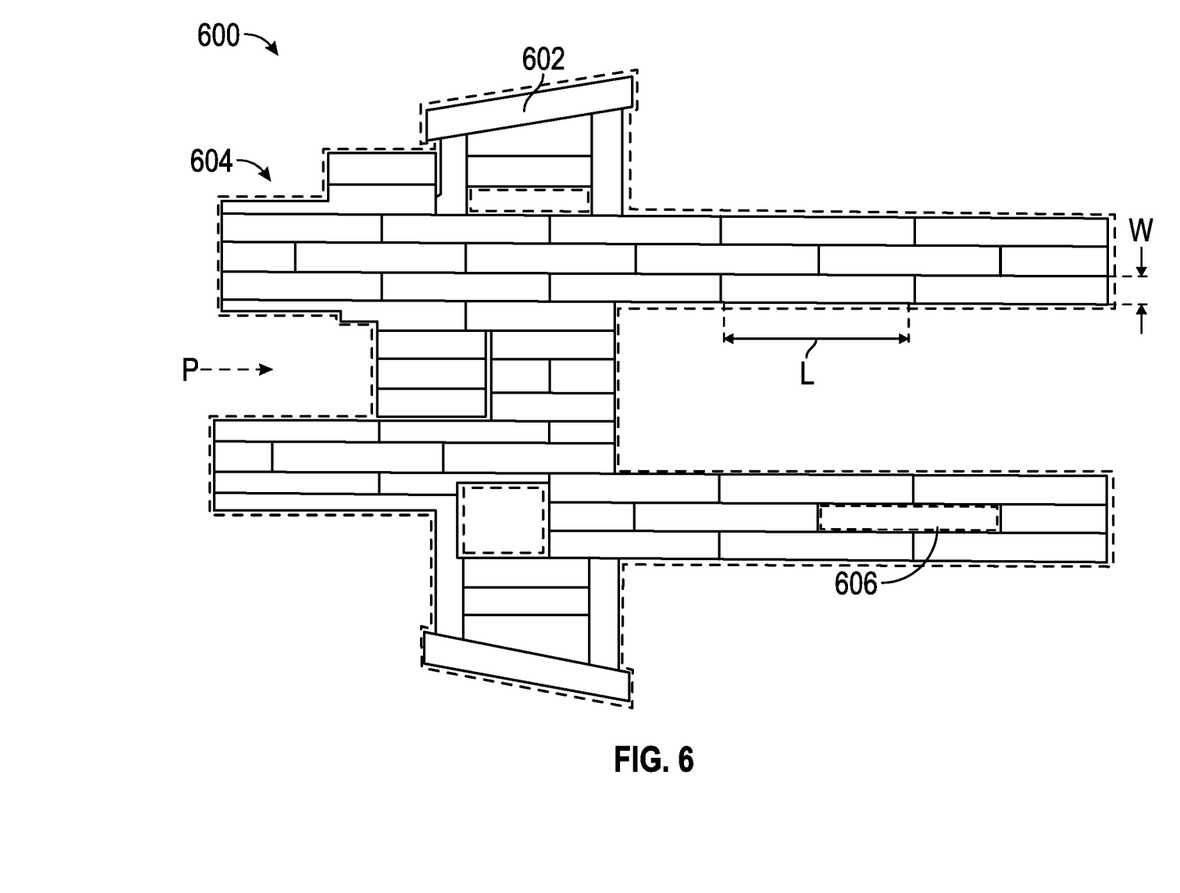
FIG. 6 is an illustration of an exemplary embodiment of a plank layout of the present disclosure.

It may further be appreciated that in embodiments, the hybrid underlayment 200, with or without the wear layer 300 is cut into and applied as floor panels 602, as illustrated in FIG. 6, which illustrates an embodiment of a floor panel layout 600. As illustrated, the floor panels 602 are generally rectangular and exhibit a length L and width W that are different from each other; the width W being less than the length L. In embodiments, the length L to width W ratio is in the range of from about 2:1 and up to about 5:1, including all values and ranges therein, such as 3.5:1, 4:1, etc. In embodiments, the width W of the floor panels 602 is in the range of from about 50.8 millimeters to about 254 millimeters, including 150 millimeters, 203 millimeters and 254 millimeters. Further, the floor panels 602 may vary in size or may be the same size and trimmed where necessary in a given layout.

The length L of the floor panels 602 is generally aligned parallel to the primary travel path P. However, in alternative embodiments, the length L of the floor panels 602 may be aligned perpendicular to the primary travel path P or, where the floor panels 602 exhibit a square geometry, they may be aligned at an angle to the direction of the primary travel path P to create a diamond pattern. The floor panels 602 define a total surface area 604 (represented by the dashed line), which is larger than the area 606 (represented by the dotted-dashed line) defined by the floor panels 602, individually. The provision of the hybrid underlayment 200 with the wear layer 300 as floor panels 602 may assist in mimicking the visual appearance of various materials, such as wood planks or tile, depending on the visual appearance of the surface 302 of the wear layer 300. Alternatively, the hybrid underlayment 200 with or without the wear layer 300 may be applied as a single sheet.

Figure 7:
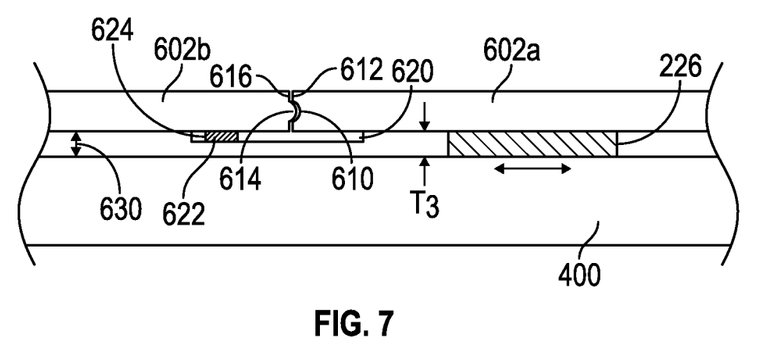
FIG. 7 is an illustration of an exemplary embodiment of floor covering planks including mating features.

When floor panels 602 are employed, the floor panels 602 include one or more mating locking features as illustrated in FIG. 7. One such locking feature includes a tongue and groove joint. One floor panel 602*a* includes a first locking feature 610, in this case a groove defined in the side 612 of the floor panel 602*a*. A second, adjacent floor panel 602*b* includes a second locking feature 614, in this case a tongue, also defined in an adjacent side 616 of the adjacent floor panel 602*b*, the tongue being sized so as to fit within and mate with the groove. It is to be appreciated that the locking features 610, 614 may include not only tongue and groove features, but also a biscuit joint, where a third piece, called a biscuit, is inserted into grooves defined in adjacent floor panels 602*a*, 602*b*; a lap joint where adjacent floor panels 602*a*, 602*b* are configured to overlap by removing material from either the underside or top side of the floor panels 602*a*, 602*b*; or the locking features 610, 614 may include dovetails defined on adjacent floor panels 602*a*, 602*b*.

FIG. 7 illustrates yet another mating locking feature that may be used to join adjacent floor panels 602*a*, 602*b* together. The feature includes a first locking feature 620, in this case a strap, affixed to a first floor panel 602*a* and a second locking feature 622, in this case a button, provided on the second, adjacent floor panel 602*b*. The first locking feature 620, the strap, includes a hole 624 defined therein, which is placed around the second locking feature 622 to mate with the second locking feature 622. The second locking feature 622 may take on any number of geometries, such as a circle, square, rectangle, triangle, etc., and may or may not (as illustrated) include an undercut. Thus, it is to be appreciated that more than one mating locking feature may be present in a given installation of the floor covering 100.

Figure 8:
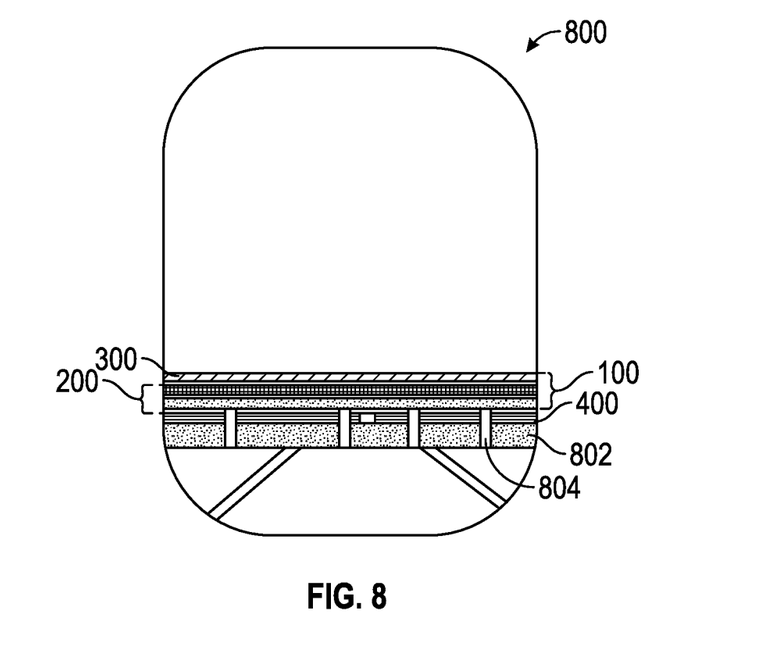
FIG. 8 is an illustration of a cross-section of an exemplary embodiment of a transportation vehicle including a floor covering affixed to a substrate.

Also provided herein is a flooring system. The floor covering 100 includes a hybrid underlayment 200 placed on a substrate 400 located within in a transportation vehicle 800, a cross-section of an embodiment of the transportation vehicle is illustrated in FIG. 8. In particular embodiments, the transportation vehicle 800 is an airplane. In alternative embodiments, the transportation vehicle includes but is not limited to a car, a passenger train, a cargo train, an emergency vehicle, or a cargo ship. In embodiments, the substrate 400 is affixed directly to a frame 802 in the transportation vehicle 800 by mechanical fasteners 804, such as nuts and bolts, screws, nails, etc.

The Substrate

The substrate 400 includes e.g., wood, plywood, oriented strand board, particle board, metal or metal alloy sheet. The metal and metal alloy includes, but is not limited to, aluminum or steel. In addition, the substrate 400 exhibits a thickness in the range of from about 2 millimeters to about 100 millimeters, including all values and ranges therein, such as 3 millimeters to 50 millimeters, 25 millimeters to 75 millimeters. etc. Further, referring again to FIGS. 1, 2 and 3, the substrate 400 includes gaps G between adjacent substrate panels 402*a*, 402*b*. The adjacent substrate panels 402*a*, 402*b* are spaced at a distance D in the range of from about 0.1 millimeters to about 3 millimeters, including all values and ranges therein. It is to be further appreciated that the thickness of each substrate panel 402*a*, 402*b* may vary, or the relative height of each substrate panel 402*a*, 402*b* may vary. Further, the thickness across the total surface area 404 of the substrate 400 (which may be coincident to the total surface area 604 of the floor panels 602) or the relative height across total surface area 404 of the substrate 400 may vary. In embodiments, the variation (difference) in thickness, or height, may be in the range of from about 0.1 millimeter to about 1.0 millimeter, including all values and ranges therein.

The compliant material layer 204, 214*b* of the hybrid underlayment 200 is affixed to the substrate 400 by a substrate adhesive layer 226. In embodiments, the substrate adhesive layer 226 is selected from the adhesives described above with regard to adhesive layer 220 placed between the rigid material layer 202 and the compliant material layer 204 and the substrate adhesive layer 226 is applied in the manner and methods noted above with regard to adhesive layer 220 placed between the rigid material layer 202 and the compliant material layer 204. In alternative embodiments, the substrate adhesive layer 226 is provided by a double sided adhesive tape 240 as illustrated and described above with reference to FIG. 4.

Figure 5:
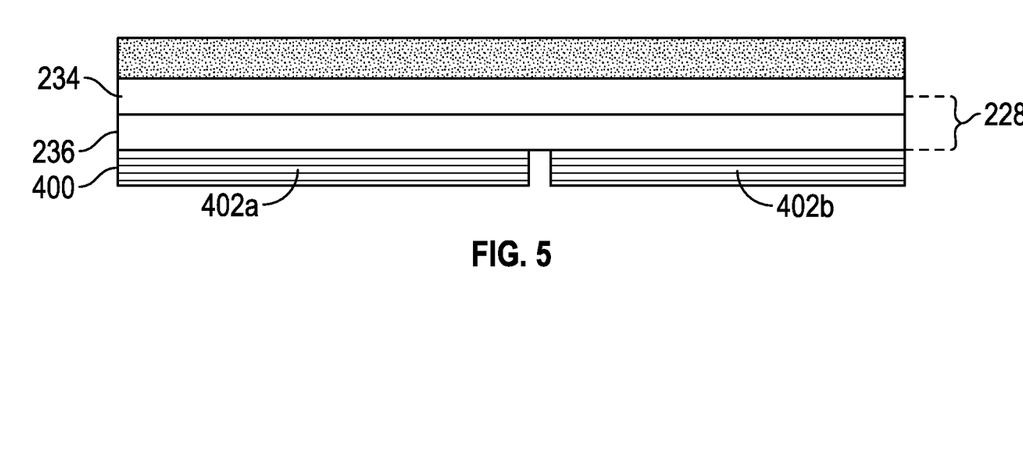
FIG. 5 is a schematic representative representation an exemplary embodiment of a hook fastener and loop fastener for use as an adhesive.

In yet further alternative embodiments, illustrated in FIG. 5, the substrate adhesive layer 226 includes a mating mechanical fastener 228, such as a hook and loop fastener. The hook and look fastener is understood to include a hook fastener 234 and a loop fastener 236, which adhere together when contacted. As illustrated, the hook fastener 234 is secured to the hybrid underlayment 200 and the loop fastener 236 is secured to the substrate 400; however, it is to be appreciated that the hook fastener 234 may be secured to the substrate 400 and the loop fastener 236 may be secured to the hybrid underlayment 200.

In embodiments of the above and as illustrated in FIG. 7, the substrate adhesive layer 226 is discontinuous, providing an offset 630 between the substrate 400 and the floor panel 602. The offset 630 exhibits a thickness $T_3$ sufficiently large enough to accommodate the first locking feature 620 and the second locking feature 622. In such embodiments, the substrate adhesive layer may include the mating mechanical fastener 228 described with reference to FIG. 5.

Figure 9:
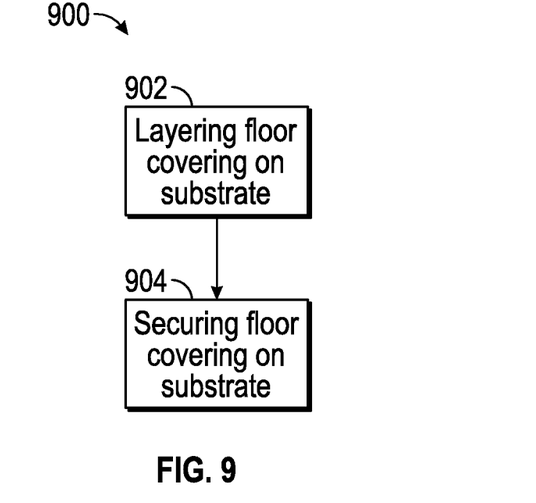
FIG. 9 is an illustrative flow chart of an exemplary embodiment of a method for reducing buckling.

A floor covering 100, including the hybrid underlayment 200 and wear layer 300 as described herein, is used in a method of reducing at least one of buckling and telescoping. FIG. 9 illustrates an embodiment of a method 900. The method 900 includes, at block 902, layering a floor covering 100 onto a substrate 400 as illustrated in FIGS. 6 and 8. The floor covering 100 includes a compliant material layer 204 and a rigid material layer 202 affixed to the compliant material layer as described with reference to FIGS. 1 through 5 and 7 above. Further, the floor covering 100 includes a wear layer 300 affixed to the rigid material layer 202, as described with reference to FIGS. 1 through 5 above. The method 900 at block 904 further includes securing the floor covering 100, and in particular the hybrid underlayment 200, to the substrate 400 as described above with reference to, e.g., FIGS. 1, 2, 3, 5, 7 and 8.

Figure 10:
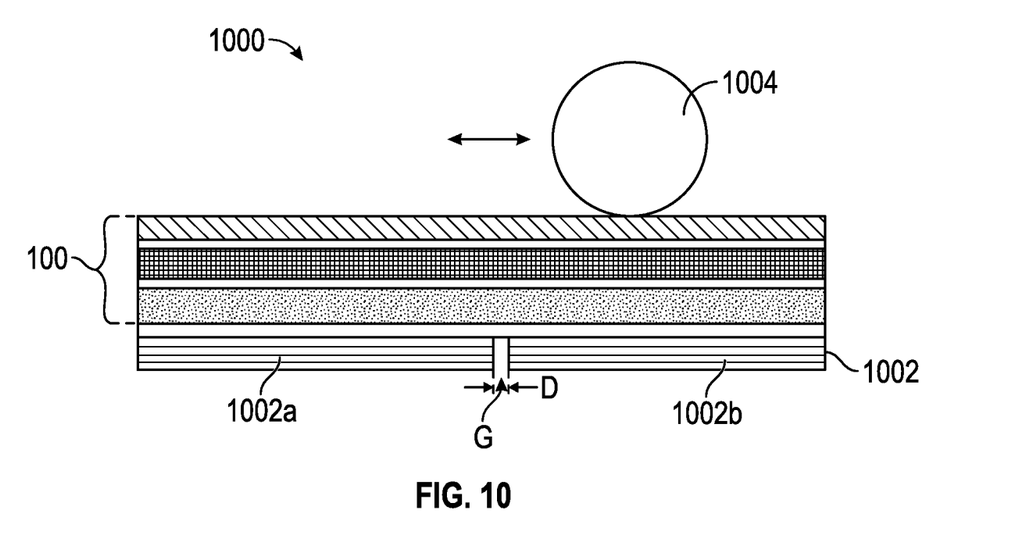
FIG. 10 is a schematic representation of a testing apparatus for measuring buckling.

An exemplary testing apparatus 1000 for test method BMS8-434, section 8.13 is illustrated in FIG. 10. FIG. 10 illustrates with a substrate 1002 including two adjacent substrate panels 1002*a*, 1002*b* with a gap G there between. The gap distance D is adjustable from about 0.025 millimeters to about 15 millimeters, including all values and ranges there between. The substrate 1002 includes any of the substrate materials enumerated above. A 1.2 meter by 0.6 meter floor covering 100 is applied to the substrate 400 using the adhesive layer 220 placed between the rigid material layer 202 and the compliant material layer 204 noted above. Then a 75 pound roller 1004 is moved back and forth across the floor covering 100 thirty (30) times. Prior to applying the floor covering to the substrate 400, the floor covering 100 is conditioned at a temperature of 21±3 C and a relative humidity of 50±10%, for a time period of 24±4 hours.

The use of the term "about" herein, is known to those skilled in the art. The term "about" may be read to include plus or minus 10 percent or less of the indicated measurement, including 5 percent or less, 2 or percent or less, 1 percent or less, etc. Thus, if the measurement is 10 GPa, "about" may be read to include 9 GPa to 1 GPa, 9.5 GPa to 10.5 GPa, 9.8 GPa to 10.2 GPa, 9.9 GPa to 10.1 GPa, etc., again as would be understood by a person skilled in the art.

The use of the term "embodiments" herein, is known to those skilled in the art. The term "embodiments" may be read to mean "examples" or like terms.

The hybrid underlayment of the present disclosure offers several advantages. These advantages include to preventing buckling and telegraphing by providing a hybrid underlayment including a rigid material layer and a compliant material layer under the wear layer of the floor covering. These advantages further include providing wear resistance. These advantages yet further include maintaining or reducing areal density and providing an aesthetically pleasing appearance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid underlayment, comprising:
    a compliant material layer, wherein the compliant material layer exhibits a compression deflection as measured according to ASTM standard D-1056-14 in the range of from about 0.14 kilogram force per square centimeter to about 1.76 kilogram force per square centimeter, and a thickness of at least about 2 millimeters; and
    a rigid material layer affixed to the compliant material layer, wherein the rigid material layer exhibits a thickness of at least about 0.5 millimeters and a flexural modulus of at least about 600 MPa and flexural strength of at least about 35 MPa, both flexural modulus and flexural strength as measured according to ASTM D790-17.

2. The hybrid underlayment of claim 1, wherein the rigid material layer comprises a fiberglass reinforced phenolic laminate.

3. The hybrid underlayment of claim 1, wherein the rigid material layer is affixed to the compliant material layer by a double sided adhesive tape.

4. The hybrid underlayment of claim 1, wherein the compliant material layer exhibits a density in the range of from about 160 kg/m³ (kilograms per cubic meter) to about 480 kg/m³.

5. The hybrid underlayment of claim 1, wherein the compliant material layer comprises at least one of an open cell foam and a closed cell foam, wherein the compliant material layer further comprises at least one polymer material selected from the group consisting of silicone, polyvinylidene, thermoset polyurethane, thermoplastic polyurethane, poly(vinyl chloride), ethylene propylene diene terepolymer, polyolefin, melamine, epichlorohydrin, styrene butadiene rubber, and polyamide.

6. The hybrid underlayment of claim 1, wherein the compliant material layer exhibits a Shore OO durometer in the range of from about 10 Shore OO to about 90 Shore OO.

7. The hybrid underlayment of claim 1, further including a wear layer affixed to the rigid material layer to form a floor covering, wherein the wear layer exhibits a Taber wear resistance of less than about 0.3 grams of weight loss as measured according to ISO 9352 with a 1 kg weight over 1,000 cycles using a H18 calibrade wheel, wherein the floor covering exhibits an areal density in the range of from about 2.4 kg per square meter to about 8.5 kilograms per square meter and an overall thickness in the range of from about 3 millimeters to about 15 millimeters.

8. The hybrid underlayment of claim 7, wherein the wear layer exhibits a thickness in the range of from about 0.25 millimeters to about 3.0 millimeters.

9. The hybrid underlayment of claim 7, wherein the wear layer comprises polyvinyl chloride.

10. The hybrid underlayment of claim 7, wherein the rigid material layer is affixed to the wear layer by a double sided adhesive tape.

11. The hybrid underlayment of claim 7, wherein the wear layer comprises a decorative layer and a sealant coating disposed on the decorative layer.

12. A transportation vehicle, comprising:
    a substrate;
    a floor covering disposed over the substrate, wherein the floor covering comprises a plurality of floor panels and the floor panels each comprise
        a compliant material layer affixed to the substrate, wherein the compliant material layer exhibits a compression deflection as measured according to ASTM standard D-1056-14 in the range of from about 0.14 kilogram force per square centimeter to about 1.76 kilogram force per square centimeter , and a thickness of at least about 2 millimeters;
        a rigid material layer affixed to the compliant material layer, wherein the rigid material layer exhibits a thickness of at least about 0.5 millimeters and a flexural modulus of at least about 600 MPa and flexural strength of at least about 35 MPa, both flexural modulus and flexural strength as measured according to ASTM D790-17; and
        a wear layer affixed to the rigid material layer, wherein the wear layer exhibits a Taber wear resistance of less than about 0.3 grams of weight loss as measured according to ISO 9352 with a 1 kg weight over 1,000 cycles using a H18 calibrade wheel,
    wherein the floor covering exhibits an areal density in the range of from about 2.4 kilograms per square meter to about 8.5 kilograms per square meter and an overall thickness in the range of from about 3.0 millimeters to about 15 millimeters.

13. The transportation vehicle of claim 12, wherein the floor covering exhibits no buckling across the total surface area of the floor covering as measured by test method BMS8-434, section 8.13 with a substrate gap closure of 2.54 millimeters.

14. The transportation vehicle of claim 12, wherein the floor panels are affixed to the substrate with a double sided adhesive tape.

15. The transportation vehicle of claim 12, wherein the floor panels are affixed to the substrate using a hook fastener and a loop fastener, wherein either the hook fastener or the loop fastener is adhered to the compliant material layer and the other of the hook fastener and the loop fastener is adhered to the substrate.

16. The transportation vehicle of claim 12, wherein at least one floor panel comprises a first locking feature that is configured to mate with a second locking feature on an adjacent floor panel.

17. The transportation vehicle of claim 16, wherein the first locking feature and the second locking feature comprises at least one of the following: tongue and groove, a lap joint, a biscuit joint, and a button and strap.

18. The transportation vehicle of claim 12, wherein the thickness of at least one of the compliant material layer and the rigid material layer vary across a total surface area of the floor covering.

19. The transportation vehicle of claim 12, wherein the transportation vehicle comprises an aircraft.

20. A method of reducing buckling in a transportation vehicle, comprising:
   layering a floor covering onto a substrate, the floor covering comprising
      a compliant material layer, wherein the compliant material layer exhibits a compression deflection as measured according to ASTM standard D-1056-14 in the range of from about 0.14 kilograms force per square centimeter to about 1.76 kilograms force per square centimeter, and a thickness of at least about 2 millimeters;
      a rigid material layer affixed to the compliant material layer, wherein the rigid material layer exhibits a thickness of at least about 0.5 millimeters and a flexural modulus of at least about 600 MPa and flexural strength of at least about 35 MPa, both flexural modulus and flexural strength as measured according to ASTM D790-17; and
      a wear layer affixed to the rigid material layer, wherein the wear layer exhibits a Taber wear resistance of less than about 0.3 grams of weight loss as measured according to ISO 9353 with a 1 kilogram (kg) weight over 1,000 cycles using a H18 calibrade wheel,
   wherein the floor covering exhibits an areal density in the range of from about 2.4 kilograms per square meter to about 8.5 kilograms per square meter and an overall thickness in the range of from about 3.0 millimeters to about 15 millimeters and wherein the floor covering exhibits no buckling across a total surface area of the floor covering as measured by test method BMS8-434, section 8.13 with a substrate gap closure of 2.54 millimeters; and
   securing the floor covering to the substrate.

\* \* \* \* \*